US012692369B2

(12) United States Patent
Wang et al.

(10) Patent No.: US 12,692,369 B2
(45) Date of Patent: Jul. 28, 2026

(54) ALKALI METAL-MODIFIED ACOUSTIC REINFORCING MATERIAL, PRODUCTION METHOD THEREOF, SPEAKER AND ELECTRONIC DEVICE

(71) Applicant: SSI NEW MATERIAL (ZHENJIANG) CO., LTD., Zhenjiang (CN)

(72) Inventors: Yijun Wang, Zhenjiang (CN); Chang Gong, Zhenjiang (CN); Lei Zhang, Zhenjiang (CN); Mingbo Guo, Zhenjiang (CN); Yuanhong Ma, Zhenjiang (CN)

(73) Assignee: SSI New Material (Zhenjiang) Co., Ltd., Zhenjiang (CN)

( * ) Notice: Subject to any disclaimer, the term of this patent is extended or adjusted under 35 U.S.C. 154(b) by 185 days.

(21) Appl. No.: 18/353,188

(22) Filed: Jul. 17, 2023

(65) Prior Publication Data

US 2024/0018339 A1     Jan. 18, 2024

(30) Foreign Application Priority Data

Jul. 18, 2022     (CN) .......................... 202210840060.9

(51) Int. Cl.
| | |
|---|---|
| *C08K 9/02* | (2006.01) |
| *C01B 39/02* | (2006.01) |
| *C01B 39/38* | (2006.01) |
| *C01B 39/40* | (2006.01) |
| *C08J 3/21* | (2006.01) |
| *H04R 1/02* | (2006.01) |
| *H04R 1/28* | (2006.01) |

(52) U.S. Cl.
CPC .............. *C08K 9/02* (2013.01); *C01B 39/026* (2013.01); *C01B 39/38* (2013.01); *C01B 39/40* (2013.01); *C08J 3/212* (2013.01); *H04R 1/025* (2013.01); *H04R 1/288* (2013.01); *C08J 2333/04* (2013.01)

(58) Field of Classification Search
CPC .......................................... C01B 39/02–39/54
See application file for complete search history.

(56) References Cited

U.S. PATENT DOCUMENTS

| | | | |
|---|---|---|---|
| 2015/0271592 A1 | 9/2015 | Papakyriacou et al. | |
| 2019/0202706 A1 | 7/2019 | Tang et al. | |
| 2020/0037063 A1* | 1/2020 | Feng ..................... | H04R 1/025 |
| 2020/0037066 A1* | 1/2020 | Feng ..................... | H04R 1/2876 |

FOREIGN PATENT DOCUMENTS

| | | | | |
|---|---|---|---|---|
| CN | 106817665 A | 6/2017 | | |
| CN | 106888423 A | 6/2017 | | |
| CN | 109437222 A | * 3/2019 | ............. | C01B 39/00 |
| CN | 109511064 A | 3/2019 | | |
| CN | 112399289 A | 2/2021 | | |

OTHER PUBLICATIONS

Machine Translation CN112399289 (Year: 2025).*
Machine translation CN109437222A (Year: 2025).*
Extended European Search Report issued on Jan. 2, 2024 for counterpart European patent application No. 23184452.3, 9 pages.
Yuan Chuan et al., "Alkali-metal-modified ZSM-5 zeolites for improvement of catalytic dehydration of lactic acid to acrylic acid," Chinese Journal of Catalysis, vol. 36, No. 11, Nov. 2015, 1861-1866.
First Office Action issued on Sep. 9, 2022 for counterpart Chinese patent application No. 202210840060.9, 9 pages.
Search report issued on Sep. 9, 2022 for counterpart Chinese patent application No. 202210840060.9, 5 pages.
Decision of Refection issued on Oct. 11, 2022 for counterpart Chinese patent application No. 202210840060.9, 13 pages.
Extended European Search Report issued on Apr. 17, 2025 for counterpart European patent application No. 24191964.6, 14 pages.
Hassanpour S et al., "Performance of modified H-ZSM-5 zeolite for dehydration of methanol to dimethyl ether," Fuel Processing Technology, Elsevier BV, NL, vo.91, No. 10, Oct. 1, 2010.
Communication Pursuant to Article 94(e) EPC issued on Mar. 4, 2026 for counterpart European patent application No. 24191964.6, 7 pages.
Communication Pursuant to Article 94(e) EPC issued on Apr. 23, 2026 for counterpart European patent application No. 23184452.3, 7 pages.

* cited by examiner

*Primary Examiner* — Alexandre F Ferre
(74) *Attorney, Agent, or Firm* — Hoffman Warnick LLC

(57)     ABSTRACT

The present disclosure provides an alkali metal-modified acoustic reinforcing material, a production method thereof, a speaker and an electronic device. The material is prepared by homogeneously mixing an alkali metal-modified molecular sieve, a binder, a dispersant and an auxiliary agent and then shaping; wherein the content of the alkali metal-modified molecular sieve is not less than 70%, the content of alkali metal is 0.001-1.45%, the dry basis content of the dispersant is 0-1%, and the dry basis content of the auxiliary agent is 0-15%, based on 100% of the total weight of the alkali metal-modified acoustic reinforcing material. Compared with the acoustic reinforcing materials prepared from an unmodified molecular sieves as a raw material, the alkali metal-modified acoustic reinforcing material has less adsorption of water and VOC, which can substantially improve its stability and reliability in terms of acoustic performance, and also improve its basic acoustic performance to some extent.

15 Claims, No Drawings

ALKALI METAL-MODIFIED ACOUSTIC REINFORCING MATERIAL, PRODUCTION METHOD THEREOF, SPEAKER AND ELECTRONIC DEVICE

CROSS-REFERENCE TO RELATED APPLICATIONS

This application claims priority to Chinese Patent Application No. 202210840060.9, filed on Jul. 18, 2022, which is hereby incorporated by reference in its entirety.

FIELD OF TECHNOLOGY

The present disclosure relates to an alkali metal-modified acoustic reinforcing material, a production method thereof, a speaker and an electronic device, and belongs to the field of materials, especially the technical field of electronic acoustic materials.

BACKGROUND OF ART

With the prosperity of social economy and the improvement of consumption level, people's demand for quality of life is increasing, and the cell phone, as the most important consumer electronics, plays a very important role in life. For the speaker as an important part of the cell phone, its quality is also increasingly important.

In particular, for the speaker of the cell phone, it is required to provide excellent acoustic performance while keeping the size as small as possible. The sound quality of the speaker is closely related to its design and manufacturing process, especially the design of the size of the rear cavity of the speaker. Usually, the smaller the rear cavity of the speaker, the worse the acoustic response of low frequency band, the worse the acoustic performance such as sound quality. Therefore, it is necessary to try to expand the rear cavity of the speaker to enhance its acoustic response in the low frequency band. The prior art approach is mainly to increase the virtual volume of the rear cavity by filling the rear cavity with a sound absorption material such as activated carbon, silica, molecular sieve, or kaolin, to enhance the gas acoustic compliance of the rear cavity, thereby improving the low frequency response. At present, the traditional acoustic reinforcing materials for speakers are obtained by using silica-aluminum molecular sieves having a MFI structure such as ZSM-5, or titanium-silica molecular sieves, as raw materials, and shaping with a binder and additives. In the application process, the acoustic reinforcing material is placed inside the cell phone speaker, which increases the volume of the rear cavity of the speaker through the adsorption principle of molecular sieves, thus achieving the purpose of improving the acoustic performance of the speaker. However, the cell phone speaker will inevitably come into contact with water, volatile organic compounds (VOC), and the like, in daily use. If the acoustic reinforcing material built into the cell phone speaker adsorbs water and VOC, its acoustic performance will be destroyed, and thus it cannot meet the requirements of people using cell phones.

Therefore, it is an urgent technical problem in the field to provide an alkali metal-modified acoustic reinforcing material, a production method thereof, a speaker and an electronic device.

SUMMARY OF THE INVENTION

In order to solve the above-mentioned disadvantages and defects, it is an object of the present disclosure to provide an alkali metal-modified acoustic reinforcing material.

It is another object of the present disclosure to provide a method for producing the alkali metal-modified acoustic reinforcing material.

It is a further object of the present disclosure is to provide a speaker provided with the alkali metal-modified acoustic reinforcing material in the rear cavity thereof.

It is a still further object of the present disclosure to provide an electronic device provided with the alkali metal-modified acoustic reinforcing material in a rear cavity of a speaker thereof.

In order to achieve the above objects, in an aspect, the present disclosure provides an alkali metal-modified acoustic reinforcing material, prepared by homogeneously mixing an alkali metal-modified molecular sieve, a binder, a dispersant and an auxiliary agent and then shaping, wherein the content of the alkali metal-modified molecular sieve is not less than 70%, the content of the alkali metal is 0.001-1.45%, the dry basis content of the dispersant is 0-1%, and the dry basis content of the auxiliary agent is 0-15%, based on 100% of the total weight of the alkali metal-modified acoustic reinforcing material.

In a specific embodiment of the alkali metal-modified acoustic reinforcing material of the present disclosure, the alkali metal-modified molecular sieve is prepared by modifying a molecular sieve with an alkali metal salt; the content of the alkali metal is 0.005-1.8%, based on 100% of the total weight of the alkali metal-modified molecular sieve.

In a specific embodiment of said alkali metal-modified acoustic reinforcing material of the present disclosure, the alkali metal-modified molecular sieve is an alkali metal-modified MFI type molecular sieve or FER type molecular sieve.

In a specific embodiment of said alkali metal-modified acoustic reinforcing material of the present disclosure, the alkali metal comprises one or more of Li, Na K, and the like.

In a specific embodiment of said alkali metal-modified acoustic reinforcing material of the present disclosure, the molecular sieve comprises a ZSM-5 molecular sieve or a ZSM-35 molecular sieve.

In a specific embodiment of said alkali metal-modified acoustic reinforcing material of the present disclosure, in the ZSM-5 molecular sieve, the molar ratio of silica to alumina is <5000:1, and the grain size is <2 μm. In some examples of the present disclosure, the molar ratio of silica to alumina is in the range of 200:1-5000:1.

In a specific embodiment of said alkali metal-modified acoustic reinforcing material of the present disclosure, in the ZSM-35 molecular sieve, the molar ratio of silica to alumina is in the range of 20:1-100:1, and the grain size is <2 μm.

In a specific embodiment of said alkali metal-modified acoustic reinforcing material of the present disclosure, the alkali metal-modified molecular sieve is prepared by a process comprising:

1) mixing a molecular sieve with water, warming up the resultant mixture solution to and mixing the mixture solution homogeneously;

2) adding an alkali metal salt to the mixture solution obtained in step 1) and reacting at a temperature of 70-90° C. for 4-6 h; and 3) upon completion of the reaction, subjecting the solution obtained in step 2) to a solid-liquid separation, continuously washing the separated solid until the conductivity of washing water is <300 μS/cm, drying the solid at a temperature of 100-200° C., and then roasting at a temperature of 350-650° C. for 2-6 h, to obtain the alkali metal-modified molecular sieve.

In some examples of the present disclosure, in step 1), the molecular sieve is mixed with water, which is 10 times the weight of the molecular sieve. Moreover, the homogeneous mixing can be achieved by stirring.

In a specific embodiment of the alkali metal-modified acoustic reinforcing material of the present disclosure, the alkali metal salt comprises one or more of an alkali metal chloride, an alkali metal nitrate, an alkali metal carbonate, and the like, and is used in an amount of by weight of the molecular sieve.

In some examples of the present disclosure, the alkali metal salt may be, for example, one or more of lithium chloride, lithium nitrate, lithium carbonate, potassium chloride, potassium nitrate, sodium chloride, sodium nitrate, sodium carbonate, potassium carbonate, and the like.

In a specific embodiment of the alkali metal-modified acoustic reinforcing material of the present disclosure, the content of the binder is 1-15% measured as the content of the solid component in the binder, based on 100% of the total weight of the alkali metal-modified acoustic reinforcing material.

In a specific embodiment of the alkali metal-modified acoustic reinforcing material of the present disclosure, the binder comprises an inorganic binder and/or an organic binder, wherein the inorganic binder comprises one or more of silica sol, alumina sol, water glass, pseudo-boehmite, and the like; and the organic binder comprises one or more of acrylate-based, epoxy-based, polyurethane-based organic binders, and the like.

In some examples of the present disclosure, the dry basis content of the dispersant may be, for example, 0.84%, 0.96%, 0.90%, 0.44%, or the like, based on 100% of the total weight of the alkali metal-modified acoustic reinforcing material.

In a specific embodiment of the alkali metal-modified acoustic reinforcing material of the present disclosure, the dispersant comprises one or more of glycerin, HPMA, liquid paraffin, and the like.

In some examples of the present disclosure, the dry basis content of the auxiliary agent may be, for example, 14.43%, 1.62%, 3.81%, 3.70%, or the like, based on 100% of the total weight of the alkali metal-modified acoustic reinforcing material.

In a specific embodiment of the alkali metal-modified acoustic reinforcing material of the present disclosure, the auxiliary agent comprise one or more of kaolin, diatomite, silica fume, bentonite, smectite, and the like.

In a specific embodiment of the alkali metal-modified acoustic reinforcing material of the present disclosure, the alkali metal-modified acoustic reinforcing material is in the shape of microspheres (particles) having a size of 50-400 μm, blocks or flakes.

In another aspect, the present disclosure further provides a method for producing the alkali metal-modified acoustic reinforcing material, comprising:

homogeneously mixing an alkali metal-modified molecular sieve, a binder, a dispersant, and an auxiliary agent to obtain a suspension, and shaping the suspension to produce the alkali metal-modified acoustic reinforcing material, wherein the content of the alkali metal-modified molecular sieve is not less than 70%, the content of the alkali metal is 0.001-1.45%, the dry basis content of the dispersant is 0-1%, and the dry basis content of the auxiliary agent is 0-15%, based on 100% of the total weight of the alkali metal-modified acoustic reinforcing material.

Herein, the shaping method is not specifically limited, and the person skilled in the art can reasonably select the shaping method according to the actual operational needs, as long as the objects of the present disclosure can be achieved. For example, when microspheres of the alkali metal-modified acoustic reinforcing material are to be produced, the shaping method may be spray drying, freeze shaping, oil-column shaping, rolling ball shaping, or the like; and when blocks or flakes of the alkali metal-modified acoustic reinforcing material are to be produced, the shaping may be carried out by a hot air drying method.

In a further aspect, the present disclosure further provides a speaker comprising one or more acoustic sensors and one or more housings which together form a rear cavity of the speaker, wherein the rear cavity of the speaker is provided with the alkali metal-modified acoustic reinforcing material.

In a still further aspect, the present disclosure further provides an electronic device, provided with the alkali metal-modified acoustic reinforcing material in a rear cavity of a speaker of the electronic device.

In a specific embodiment of the electronic device of the present disclosure, the electronic device comprises a smartphone, a TWS earphone, a headset, a smart glass, a smart watch, a VR device, a AR device, a tablet PC or a thin and light laptop.

In the present disclosure, a molecular sieve (such as ZSM-5 molecular sieve or ZSM-35 molecular sieve) is modified with an alkali metal salt to produce an alkali metal-modified molecular sieve, and an alkali metal-modified acoustic reinforcing material is produced from the alkali metal-modified molecular sieve as a raw material and installed in a rear cavity of a speaker, results in less adsorption of water and VOC than the acoustic reinforcement material prepared from an unmodified molecular sieve as a raw material, which can substantially improve its stability and reliability in terms of acoustic performance, and also improve its basic acoustic performance to some extent.

DETAILED DESCRIPTION OF PREFERRED EMBODIMENTS

A "range", as disclosed in the present disclosure, is given in the form of a lower limit and an upper limit. There may be one or more lower limits, and one or more upper limits, respectively. A given range is defined by selecting a lower limit and an upper limit, and the selected lower and upper limits define the boundaries of a particular range. All ranges limited in this manner are combinable, i.e., any lower limit can be combined with any upper limit to form a range. For example, if the ranges 60-120 and 80-110 are listed for a specific parameter, this is understood to mean that the ranges 60-110 and 80-120 are also intended. In addition, for a range, if the minimum values listed are 1 and 2 and the maximum values listed are 3, 4 and 5, all the following ranges can be expected: 1-3, 1-4, 1-5, 2-3, 2-4 and 2-5.

In the present disclosure, the numerical range "a-b" indicates an abbreviated representation of any combination of real numbers between a and b, where both a and b are real numbers, unless specified otherwise. For example, the numerical range "0-5" indicates that all real numbers between "0-5" are already listed in the present disclosure, and "0-5" is only an abbreviated representation of these combinations of values.

The term "two" as used in this specification means "at least two", unless specified otherwise.

In the present disclosure, all embodiments as well as preferred embodiments mentioned in the present disclosure can be combined with each other to form new technical solutions, unless specified otherwise.

In the present disclosure, all technical features as well as preferred features mentioned in the present disclosure can be combined with each other to form new technical solutions, unless specified otherwise.

In the present disclosure, all the steps mentioned herein may be performed sequentially or randomly, but preferably sequentially, unless specified otherwise. For example, the method including steps (a) and (b) indicates that the method may include steps (a) and (b) performed sequentially, or may include steps (b) and (a) performed sequentially. For example, when reference to the method may further include step (c), it means that step (c) may be added to the method in any order, for example, the method may include steps (a), (b) and (c), or may include steps (a), (c) and (b), or may include steps (c), (a) and (b), etc.

In the present disclosure, the "comprise" mentioned herein may be either open-ended, or closed-ended, unless specified otherwise. For example, the "comprise" may indicate that other components not listed may also be included, or only listed components may be included.

In order to make the objects, technical solutions and advantages of the present disclosure more clearly understood, the present disclosure is described in further detail below in conjunction with the tables and examples. The examples described below are a part of the examples of the present disclosure, and not all of them. They are used only to illustrate the present disclosure and should not be regarded as limiting the scopes of the present disclosure. Based on the examples in the present disclosure, all other examples obtained by a person of ordinary skill in the art without inventive work fall within the protections scopes of the present disclosure. The examples, in which no specific conditions are indicated, are performed according to conventional conditions or conditions recommended by the manufacturer. The reagents or apparatus used, for which the manufacturers are not indicated, are conventional products that can be obtained by commercially available purchase or by methods known in the art. For example, both the ZSM-5 molecular sieve and ZSM-35 molecular sieve described in the present disclosure are molecular sieve materials known in the art and can be purchased directly from the market or synthesized according to literature methods.

The silica sol used in Examples or Comparative Examples of the present disclosure is a commercial product purchased from Shandong Peak-tech New Material Co., Ltd, Model HP3010, with a silica content of 30% by weight.

The alumina sol used in Examples or Comparative Examples of the present disclosure is a commercial product purchased from Hunan Xinpeng Petrochemical Co., Ltd, with a alumina content of 20% by weight.

The epoxy binder used in Examples or Comparative Examples of the present disclosure is a commercial product purchased from Hunan Linte Technology Co., Ltd, Model LINTEC EP-602PRO, with a viscosity of 4000-6000 cps.

The water-based acrylate binder used in Examples or Comparative Examples of the present disclosure is a commercial product purchased from Guangzhou Guanzhi New Material Technology Co., Ltd, Model PA-4867, with a viscosity of <2000 mPa-s.

The water glass used in Examples or Comparative Examples of the present disclosure is purchased from Dongtai Yongtai Chemical Co., Ltd, with a molar ratio (SiO$_2$/Na$_2$O) of 1.5.

The kaolin used in Examples or Comparative Examples of the present disclosure is a commercial product purchased from China Kaolin Clay Co., Ltd, Model Hand 2 #powder, with a solid content of 85%.

The diatomite used in Examples or Comparative Examples of the present disclosure is T-type diatomite manufactured by Qingdao Shengtai Silicon Industry Co., Ltd, with a solid content of 85%.

The bentonite used in Examples or Comparative Examples of the present disclosure is a commercial product purchased from Aladdin Reagent (Shanghai) Co., Ltd, Model Bentone SD-1.

The silica fume used in Examples or Comparative Examples of the present disclosure is a commercial product purchased from Aladdin Reagent (Shanghai) Co., Ltd, with a purity of >99% and a particle size of 1 μm.

Hydrogen-Type ZSM-5 Molecular Sieve Comparative Examples

Comparative Examples 1 to 5

Comparative Examples 1 to 5 provided a series of hydrogen-type ZSM-5 molecular sieves (MFI-type molecular sieves) labeled as Comparative Samples 1 to 5, respectively, all of which were obtained commercially. Comparative Samples 1 to 5 have a silica-alumina ratio of 200, 400, 800, 1500 and 4500, respectively.

The elemental compositions of Comparative Samples 1 to 5 were analyzed using an inductively coupled plasma analyzer (ICP, Perkin-Elmer 3300 DV), respectively, and the specific results are shown in Table 1 below.

TABLE 1

| Sample name | Molar ratio of silica to alumina | Sodium mass content, wt % | Potassium mass content, wt % | Lithium mass content, wt % |
|---|---|---|---|---|
| Comparative Sample 1 | 208:1 | 0.0021 | 0.0023 | 0 |
| Comparative Sample 2 | 421:1 | 0.0041 | 0.0018 | 0 |
| Comparative Sample 3 | 788:1 | 0.0034 | 0.0012 | 0 |
| Comparative Sample 4 | 1425:1 | 0.0036 | 0.0015 | 0 |
| Comparative Sample 5 | 4721:1 | 0.0036 | 0.0017 | 0 |

ZSM-35 Molecular Sieve Comparative Samples

Comparative Samples 6 to 8

Comparative Samples 6 to 8 provided a series of ZSM-35 molecular sieves (FER-type molecular sieves) labeled as Comparative Samples 6 to 8, respectively, all of which were obtained commercially. Comparative Samples 6 to 8 have a silica-alumina ratio of 20, 50 and 90, respectively.

The elemental compositions of Comparative Samples 6 to 8 were analyzed using an inductively coupled plasma analyzer (ICP, Perkin-Elmer 3300 DV), respectively, and the specific results are shown in Table 2 below.

TABLE 2

| Sample name | Molar ratio of silica to alumina | Sodium mass content, wt % | Potassium mass content, wt % | Lithium mass content, wt % |
|---|---|---|---|---|
| Comparative | 22:1 | 0.0018 | 0.0012 | 0 |

TABLE 2-continued

| Sample name | Molar ratio of silica to alumina | Sodium mass content, wt % | Potassium mass content, wt % | Lithium mass content, wt % |
|---|---|---|---|---|
| Sample 6 | | | | |
| Comparative Sample 7 | 45:1 | 0.0017 | 0.0015 | 0 |
| Comparative Sample 8 | 93:1 | 0.0023 | 0.0013 | 0 |

Examples of Alkali Metal-Modified ZSM-5 Molecular Sieves

Example 1

This example provided a lithium-modified ZSM-5 molecular sieve, which was prepared by a production method comprising the following specific steps:

1) 2000 g of deionized water was weighed and added to a 3 L plastic beaker, and then 200 g of Comparative Sample 1 was added to the beaker. It was warmed up to 80° C. under stirring, such as stirring for 30 min.
  2) After the temperature of the mixture solution obtained in step 1) was warmed up to 80° C., 40 g of lithium chloride was weighed and added to the mixture solution, and allowed to react under stirring for 4 h.
  3) After 4 h, the solid and liquid were separated from the slurry by centrifugation, and the solid was washed continuously using deionized water until the conductivity of the washing water was <300 μS/cm. When the washing was stopped, the filter cake was removed and dried at 100° C. and roasted at 350° C. for 6 h. The roasted sample was the lithium-modified ZSM-5 molecular sieve, labeled as Sample 1.

Example 2

This example provided a sodium-modified ZSM-5 molecular sieve, which was prepared by a production method comprising the following specific steps:

1) 2000 g of deionized water was weighed and added to a 3 L plastic beaker, and then 200 g of Comparative Sample 2 was added to the beaker. It was warmed up to 70° C. under stirring, such as stirring for 30 min.
  2) After the temperature of the mixture solution obtained in step 1) was warmed up to 70° C., 20 g of sodium chloride was weighed and added to the mixture solution, and allowed to react under stirring for 4 h.
  3) After 4 h, the solid and liquid were separated from the slurry by centrifugation, and the solid was washed continuously using deionized water until the conductivity of the washing water was <300 μS/cm. When the washing was stopped, the filter cake was removed and dried at 200° C. and roasted at 650° C. for 2 h. The roasted sample was the sodium-modified ZSM-5 molecular sieve, labeled as Sample 2.

Example 3

This example provided a potassium-modified ZSM-5 molecular sieve, which was prepared by a production method comprising the following specific steps:

1) 2000 g of deionized water was weighed and added to a 3 L plastic beaker, and then 200 g of Comparative Sample 3 was added to the beaker. It was warmed up to 90° C. under stirring, such as stirring for 30 min.

2) After the temperature of the mixture solution obtained in step 1) was warmed up to 90° C., 20 g of potassium chloride was weighed and added to the mixture solution, and allowed to react under stirring for 4 h.
  3) After 4 h, the solid and liquid were separated from the slurry by centrifugation, and the solid was washed continuously using deionized water until the conductivity of the washing water was <300 μS/cm. When the washing was stopped, the filter cake was removed and dried at 150° C. and roasted at 550° C. for 4 h. The roasted sample was the potassium-modified ZSM-5 molecular sieve, labeled as Sample 3.

Example 4

This example provided a lithium-modified ZSM-5 molecular sieve, which was prepared by a production method comprising the following specific steps:

1) 2000 g of deionized water was weighed and added to a 3 L plastic beaker, and then 200 g of Comparative Sample 4 was added to the beaker. It was warmed up to 80° C. under stirring, such as stirring for 30 min.
  2) After the temperature of the mixture solution obtained in step 1) was warmed up to 80° C., 10 g of lithium nitrate was weighed and added to the mixture solution, and allowed to react under stirring for 4 h.
  3) After 4 h, the solid and liquid were separated from the slurry by centrifugation, and the solid was washed continuously using deionized water until the conductivity of the washing water was <300 μS/cm. When the washing was stopped, the filter cake was removed and dried at 150° C. and roasted at 550° C. for 4 h. The roasted sample was the lithium-modified ZSM-5 molecular sieve, labeled as Sample 4.

Example 5

This example provided a lithium-modified ZSM-5 molecular sieve, which was prepared by a production method comprising the following specific steps:

1) 2000 g of deionized water was weighed and added to a 3 L plastic beaker, and then 200 g of Comparative Sample 5 was added to the beaker. It was warmed up to 80° C. under stirring, such as stirring for 30 min.
  2) After the temperature of the mixture solution obtained in step 1) was warmed up to 80° C., 15 g of lithium carbonate was weighed and added to the mixture solution, and allowed to react under stirring for 4 h.
  3) After 4 h, the solid and liquid were separated from the slurry by centrifugation, and the solid was washed continuously using deionized water until the conductivity of the washing water was <300 μS/cm. When the washing was stopped, the filter cake was removed and dried at 150° C. and roasted at 550° C. for 4 h. The roasted sample was the lithium-modified ZSM-5 molecular sieve, labeled as Sample 5.

Examples of Alkali Metal-Modified ZSM-35 Molecular Sieves

Example 6

This example provided a potassium-modified ZSM-35 molecular sieve, which was prepared by a production method comprising the following specific steps:

1) 2000 g of deionized water was weighed and added to a 3 L plastic beaker, and then 200 g of Comparative Sample 6 was then added to the beaker. It was warmed up to 80° C. under stirring, such as stirring for 30 min.

2) After the temperature of the mixture solution obtained in step 1) was warmed up to 80° C., 35 g of potassium nitrate was weighed and added to the mixture solution, and allowed to react under stirring for 4 h.

3) After 4 h, the solid and liquid were separated from the slurry by centrifugation, and the solid was washed continuously using deionized water until the conductivity of the washing water was <300 μS/cm. When the washing was stopped, the filter cake was removed and dried at 150° C. and roasted at 550° C. for 4 h. The roasted sample was the potassium-modified ZSM-35 molecular sieve, labeled as Sample 6.

Example 7

This example provided a sodium-modified ZSM-35 molecular sieve, which was prepared by a production method comprising the following specific steps:

1) 2000 g of deionized water was weighed and added to a 3 L plastic beaker, and then 200 g of Comparative Sample 7 was added to the beaker. It was warmed up to 80° C. under stirring, such as stirring for 30 min.

2) After the temperature of the mixture solution obtained in step 1) was warmed up to 80° C., 15 g of sodium nitrate was weighed and added to the mixture solution, and allowed to react under stirring for 4 h.

3) After 4 h, the solid and liquid were separated from the slurry by centrifugation, and the solid was washed continuously using deionized water until the conductivity of the washing water was <300 μS/cm. When the washing was stopped, the filter cake was removed and dried at 150° C. and roasted at 550° C. for 4 h. The roasted sample was the sodium-modified ZSM-35 molecular sieve, labeled as Sample 7.

Example 8

This example provided a sodium-modified ZSM-35 molecular sieve, which was prepared by a production method comprising the following specific steps:

1) 2000 g of deionized water was weighed and added to a 3 L plastic beaker, and then 200 g of Comparative Sample 8 was added to the beaker. It was warmed up to 80° C. under stirring, such as stirring for 30 min.

2) After the temperature of the mixture solution obtained in step 1) was warmed up to 80° C., 15 g of sodium chloride was weighed and added to the mixture solution, and allowed to react under stirring for 4 h.

3) After 4 h, the solid and liquid were separated from the slurry by centrifugation, and the solid was washed continuously using deionized water until the conductivity of the washing water was <300 μS/cm. When the washing was stopped, the filter cake was removed and dried at 150° C. and roasted at 550° C. for 4 h. The roasted sample was the sodium-modified ZSM-35 molecular sieve, labeled as Sample 8.

Examples of Alkali Metal-Modified Acoustic Reinforcing Materials

Example 9

This example provided a lithium-modified acoustic reinforcing material, which was prepared by a production method comprising the following specific steps:

100 g of Sample 1, 44 g of a water-based acrylate binder with a dry basis content of 40%, 1 g of glycerin and 100 g of water were weighed and mixed, stirred thoroughly for 1 h, and shaped by a spray drying process, to obtain a microsphere sample having a median diameter D50 of 358 μm, labeled as Sample 9. The mass content of the lithium-modified ZSM-5 molecular sieve was 84.32%, the mass content of the binder was 14.84%, the mass content of the dispersant was 0.84%, and the mass content of the auxiliary agent was 0%, based on 100% of the total weight of Sample 9.

Example 10

This example provided a sodium-modified acoustic reinforcing material, which was prepared by a production method comprising the following specific steps:

100 g of Sample 2, 70 g of a silica sol with a dry basis content of 30%, 24 g of diatomite and 100 g of water were weighed and mixed, stirred thoroughly for 1 h, and shaped by a spray drying process, to obtain a microsphere sample having a median diameter D50 of 55 μm, labeled as Sample 10. The mass content of the sodium-modified ZSM-5 molecular sieve was 70.72%, the mass content of the binder was 14.85%, the mass content of the dispersant was 0%, and the mass content of the auxiliary agent was 14.43%, based on 100% of the total weight of Sample 10.

Example 11

This example provided a potassium-modified acoustic reinforcing material, which was prepared by a production method comprising the following specific steps:

100 g of Sample 3, 10 g of an alumina sol with a dry basis content of 20%, 1 g of liquid paraffin, 2 g of silica fume and 100 g of water were weighed and mixed, stirred thoroughly for 1 h, and shaped by a spray drying process, to obtain a microsphere sample having a median diameter D50 of 156 μm, labeled as Sample 11. The mass content of the potassium-modified ZSM-5 molecular sieve was 95.51%, the mass content of the binder was 1.91%, the mass content of the dispersant was 0.96%, and the mass content of the auxiliary agent was 1.62%, based on 100% of the total weight of Sample 11.

Example 12

This example provided a lithium-modified acoustic reinforcing material, which was prepared by a production method comprising the following specific steps:

100 g of Sample 4, 25 g of water glass with a dry basis content of 25%, 1 g of liquid paraffin, 5 g of bentonite and 100 g of water were weighed and mixed, stirred thoroughly for 1 h, and shaped by a spray drying process, to obtain a microsphere sample having a median diameter D50 of 222 μm, labeled as Sample 12. The mass content of the lithium-modified ZSM-5 molecular sieve was 89.69%, the mass content of the binder was 5.60%, the mass content of the dispersant was 0.90%, and the mass content of the auxiliary agent was 3.81%, based on 100% of the total weight of Sample 12.

Example 13

This example provided a lithium-modified acoustic reinforcing material, which was prepared by a production method comprising the following specific steps:

100 g of Sample 5, 10 g of epoxy binder, 0.5 g of glycerin, 5 g of kaolin and 100 g of water were weighed and mixed, stirred thoroughly for 1 h, and shaped by a spray drying process, to obtain a microsphere sample having a median diameter D50 of 276 μm, labeled as Sample 13. The mass content of the lithium-modified ZSM-5 molecular sieve was 87.15%, the mass content of the binder was 8.71%, the mass content of the dispersant was 0.44%, and the mass content of the auxiliary agent was 3.70%, based on 100% of the total weight of Sample 13.

Example 14

This example provided a potassium-modified acoustic reinforcing material, which was prepared by a production method comprising the following specific steps:

100 g of Sample 6, 44 g of a water-based acrylate binder with a dry basis content of 40%, 1 g of glycerin and 100 g of water were weighed and mixed, stirred thoroughly for 1 h, and shaped by a spray drying process, to obtain a microsphere sample having a median diameter D50 of 365 μm, labeled as Sample 14. The mass content of the potassium-modified ZSM-5 molecular sieve was 84.32%, the mass content of the binder was 14.84%, the mass content of the dispersant was 0.84%, and the mass content of an auxiliary agent was 0%, based on 100% of the total weight of Sample 14.

Example 15

This example provided a sodium-modified acoustic reinforcing material, which was prepared by a production method comprising the following specific steps:

100 g of Sample 7, 44 g of a water-based acrylate binder with a dry basis content of 40%, 1 g of glycerin and 100 g of water were weighed and mixed, stirred thoroughly for 1 h, and shaped by a spray drying process, to obtain a microsphere sample having a median diameter D50 of 381 μm, labeled as Sample 15. The mass content of the sodium-modified ZSM-5 molecular sieve was 84.32%, the mass content of the binder was 14.84%, the mass content of the dispersant was 0.84%, and the mass content of an auxiliary agent was 0%, based on 100% of the total weight of Sample 15.

Example 16

This example provided a sodium-modified acoustic reinforcing material, which was prepared by a production method comprising the following specific steps:

100 g of Sample 8, 44 g of a water-based acrylate binder with a dry basis content of 40%, 1 g of glycerin and 100 g of water were weighed and mixed, stirred thoroughly for 1 h, and shaped by a spray drying process, to obtain a microsphere sample having a median diameter D50 of 379 μm, labeled as Sample 16. The mass content of the sodium-modified ZSM-5 molecular sieve was 84.32%, the mass content of the binder was 14.84%, the mass content of the dispersant was 0.84%, and the mass content of an auxiliary agent was 0%, based on 100% of the total weight of Sample 16.

Comparative Examples of Acoustic Reinforcing Materials

Comparative Example 9

This Comparative Example provided an acoustic reinforcing material, which was prepared by a production method comprising the following specific steps:

100 g of Comparative Sample 1, 44 g of a water-based acrylate binder with a dry basis content of 40%, 1 g of glycerin and 100 g of water were weighed and mixed, stirred thoroughly for 1 h, and shaped by a spray drying process, to obtain a microsphere sample having a median diameter D50 of 345 μm, labeled as Comparative Sample 9.

Comparative Example 10

This Comparative Example provided an acoustic reinforcing material, which was prepared by a production method comprising the following specific steps:

100 g of Comparative Sample 2, 70 g of a silica sol with a dry basis content of 30%, 24 g of diatomite and 100 g of water were weighed and mixed, stirred thoroughly for 1 h, and shaped by a spray drying process, to obtain a microsphere sample having a median diameter D50 of 54 μm, labeled as Comparative Sample 10.

Comparative Example 11

This Comparative Example provided an acoustic reinforcing material, which was prepared by a production method comprising the following specific steps:

100 g of Comparative Sample 3, 10 g of an alumina sol with a dry basis content of 20%, 1 g of liquid paraffin, 2 g of silica fume and 100 g of water were weighed and mixed, stirred thoroughly for 1 h, and shaped by a spray drying process, to obtain a microsphere sample having a median diameter D50 of 154 μm, labeled as Comparative Sample 11.

Comparative Example 12

This Comparative Example provided an acoustic reinforcing material, which was prepared by a production method comprising the following specific steps:

100 g of Comparative Sample 4, 25 g of water glass with a dry basis content of 25%, 1 g of liquid paraffin, 5 g of bentonite and 100 g of water were weighed and mixed, stirred thoroughly for 1 h, and shaped by a spray drying process, to obtain a microsphere sample having a median diameter D50 of 234 μm, labeled as Comparative Sample 12.

Comparative Example 13

This Comparative Example provided an acoustic reinforcing material, which was prepared by a production method comprising the following specific steps:

100 g of Comparative Sample 5, 10 g of an epoxy binder, 0.5 g of glycerin, 5 g of kaolin and 100 g of water were weighed and mixed, stirred thoroughly for 1 h, and shaped by a spray drying process, to obtain a microsphere sample having a median diameter D50 of 281 μm, labeled as Comparative Sample 13.

Comparative Example 14

This Comparative Example provided an acoustic reinforcing material, which was prepared by a production method comprising the following specific steps:

100 g of Comparative Sample 6, 44 g of a water-based acrylate binder with a dry basis content of 40%, 1 g of glycerin and 100 g of water were weighed and mixed, stirred thoroughly for 1 h, and shaped by a spray drying process, to obtain a microsphere sample having a median diameter D50 of 378 μm, labeled as Comparative Sample 14.

Comparative Example 15

This Comparative Example provided an acoustic reinforcing material, which was prepared by a production method comprising the following specific steps:

100 g of Comparative Sample 7, 44 g of a water-based acrylate binder with a dry basis content of 40%, 1 g of glycerin and 100 g of water were weighed and mixed, stirred thoroughly for 1 h, and shaped by a spray drying process, to obtain a microsphere sample having a median diameter D50 of 366 μm, labeled as Comparative Sample 15.

Comparative Example 16

This Comparative Example provided an acoustic reinforcing material, which was prepared by a production method comprising the following specific steps:

100 g of Comparative Sample 8, 44 g of a water-based acrylate binder with a dry basis content of 40%, 1 g of glycerin and 100 g of water were weighed and mixed, stirred thoroughly for 1 h, and shaped by a spray drying process, to obtain a microsphere sample having a median diameter D50 of 367 μm, labeled as Comparative Sample 16.

Testing Example 1

In this testing example, the elemental contents of Si, Al, Li, Na, K and the like in Samples 1-5 are analyzed and measured with an inductively coupled plasma analyzer (ICP, Perkin-Elmer 3300 DV), respectively, and the measurement results obtained are shown in Table 3 below:

TABLE 3

| Sample name | Molar ratio of silica to alumina | Sodium mass content, wt % | Potassium mass content, wt % | Lithium mass content, wt % |
|---|---|---|---|---|
| Sample 1 | 214:1 | 0.0023 | 0.0031 | 0.4300 |
| Sample 2 | 401:1 | 0.4100 | 0.0021 | 0.0000 |
| Sample 3 | 799:1 | 0.0031 | 0.2400 | 0.0000 |
| Sample 4 | 1487:1 | 0.0035 | 0.0017 | 0.0094 |
| Sample 5 | 4895:1 | 0.0023 | 0.0014 | 0.0063 |

From Table 3 above, it can be seen that all of the ZSM-5 molecular sieves prepared in Examples 1-5 of the present disclosure contain alkali metals, which are lithium, sodium, potassium, lithium and lithium, respectively. That is, the alkali metal-modified ZSM-5 molecular sieves are successfully produced in these examples.

Testing Example 2

In this testing example, the elemental contents of Si, Ti, Li, Na, K and the like in Samples 6-8 are analyzed and measured with an inductively coupled plasma analyzer (ICP, Perkin-Elmer 3300 DV), respectively, and the measurement results obtained are shown in Table 4 below:

TABLE 4

| Sample name | Molar ratio of silica to alumina | Sodium mass content, wt % | Potassium mass content, wt % | Lithium mass content, wt % |
|---|---|---|---|---|
| Sample 6 | 23:1 | 0.0010 | 1.7089 | 0 |
| Sample 7 | 47:1 | 0.4100 | 0.0021 | 0 |
| Sample 8 | 91:1 | 0.1300 | 0.0017 | 0 |

From Table 4 above, it can be seen that all of the ZSM-35 molecular sieves prepared in Examples 6-8 of the present disclosure contain alkali metals, which are potassium, sodium and sodium, respectively. That is, the alkali metal-modified ZSM-5 molecular sieves are successfully produced in these examples.

Testing Example 3

In this testing example, each of Samples 9-16 and Comparative Samples 9-16 was tested for acoustic performance, specifically as follows:

0.14 g of each of Samples and Comparative Samples was tested for acoustic performance, i.e., AFO of each of Samples and Comparative Samples was measured with a surface resistance tester. The tests were performed using conventional methods in the art. For example, the specific testing method of acoustic performance can be carried out by referring to the method of "measurement of electrical impedance" shown in paragraphs 0049-0054 of Chinese patent application publication CN105049997A.

In this testing example, the testing environment is a speaker module having a target cavity of 0.2 cc; and the measurement results obtained are shown in Table 5 below:

TABLE 5

| Sample name | $\Delta F_0$/Hz | Sample name | $\Delta F_0$/Hz |
|---|---|---|---|
| Sample 9 | 132 | Comparative Sample 9 | 54 |
| Sample 10 | 129 | Comparative Sample 10 | 102 |
| Sample 11 | 131 | Comparative Sample 11 | 128 |
| Sample 12 | 137 | Comparative Sample 12 | 133 |
| Sample 13 | 139 | Comparative Sample 13 | 132 |
| Sample 14 | 156 | Comparative Sample 14 | 134 |
| Sample 15 | 177 | Comparative Sample 15 | 151 |
| Sample 16 | 181 | Comparative Sample 16 | 162 |

From the basic testing results $\Delta F_0$ of Samples and Comparative Samples shown in Table 5 above, it can be seen that the acoustic performances of the alkali metal-modified ZSM-5 molecular sieves obtained by modification of ZSM-5 molecular sieves with alkali metal in Examples of the present disclosure are all improved to some extent, especially the acoustic performances of the ZSM-5 molecular sieves having low silica-alumina ratio are greatly improved. For example, in Sample 9, $\Delta F_0$ is increased from 54 before the alkali metal modification to 132 after the modification. Also, seen from Table 5, the acoustic performances of the alkali metal-modified molecular sieves, i.e., ZSM-35 molecular sieves (Samples 14-16), are also improved to some extent.

Testing Example 4

In this testing example, each of Samples 9-16 and Comparative Samples 9-16 subjected to a high temperature and high humidity treatment was tested for acoustic performance, by using the method as shown in the Testing Example 3, wherein the high temperature and high humidity treatment was performed on each of Samples and Comparative Samples at a relative humidity of 85% and a temperature of 85° C.

The measurement results obtained in this test example are shown in Table 6 below:

TABLE 6

| Sample name | $\Delta F_0$/Hz | $\Delta F_0$/Hz after high temperature and high humidity treatment | $\Delta F_0$ offset/Hz | Decrease/% |
|---|---|---|---|---|
| Sample 9 | 132 | 102 | −30 | 22.7 |
| Sample 10 | 129 | 106 | −23 | 17.8 |
| Sample 11 | 131 | 128 | −3 | 2.29 |
| Sample 12 | 137 | 133 | −4 | 2.92 |
| Sample 13 | 139 | 138 | −1 | 0.719 |
| Sample 14 | 156 | 149 | −7 | 4.49 |
| Sample 15 | 177 | 167 | −10 | 5.65 |
| Sample 16 | 181 | 172 | −9 | 4.97 |
| Comparative Sample 9 | 54 | 12 | −42 | 77.8 |
| Comparative Sample 10 | 102 | 34 | −68 | 66.7 |
| Comparative Sample 11 | 128 | 66 | −62 | 48.4 |
| Comparative Sample 12 | 133 | 101 | −32 | 24.1 |
| Comparative Sample 13 | 132 | 105 | −27 | 20.5 |
| Comparative Sample 14 | 134 | 29 | −105 | 78.4 |
| Comparative Sample 15 | 151 | 53 | −98 | 64.9 |
| Comparative Sample 16 | 162 | 67 | −95 | 58.6 |

From the testing results of $\Delta F_0$ of Samples and Comparative Samples subjected to the high temperature and high humidity treatment shown in Table 6 above, it can be seen that the stability of the ZSM-5 molecular sieve or ZSM-35 molecular sieve modified with alkali metal ions at high temperature and high humidity has been greatly improved, as compared with that of an unmodified ZSM-5 molecular sieve or ZSM-35 molecular sieve. In particular, for the ZSM-5 molecular sieve or ZSM-35 molecular sieve with low silica-alumina ratio, the stability thereof at high temperature and high humidity is improved more significantly, which indicates that the modification with alkali metal has greatly improved the stability of the molecular sieve samples at high temperature and high humidity.

Testing Example 5

In this testing example, each of Samples 9-16 and Comparative Samples 9-16 after VOC adsorption was tested for acoustic performance, specifically as follows:

each of Samples and Comparative Samples to be tested was placed in a reagent bottle together with toluene adsorbent and baked at 80° C. for 4 h. After 4 h, Samples and Comparative Samples were taken out, and $\Delta F_0$ of Samples and Comparative Samples was tested using the method shown in Testing Example 3.

The measurement results obtained in this testing example are shown in Table 7 below:

TABLE 7

| Sample name | $\Delta F_0$/Hz | $\Delta F_0$/Hz after VOC adsorption | $\Delta F_0$ offset/Hz | Decrease/% |
|---|---|---|---|---|
| Sample 9 | 132 | 72 | −60 | 45.5 |
| Sample 10 | 129 | 76 | −53 | 41.1 |
| Sample 11 | 131 | 84 | −47 | 35.9 |
| Sample 12 | 137 | 98 | −39 | 28.5 |
| Sample 13 | 139 | 123 | −16 | 11.5 |
| Sample 14 | 156 | 101 | −55 | 35.3 |
| Sample 15 | 177 | 128 | −49 | 27.7 |
| Sample 16 | 181 | 144 | −37 | 20.4 |
| Comparative Sample 9 | 54 | 4 | −50 | 92.6 |
| Comparative Sample 10 | 102 | 41 | −61 | 59.8 |
| Comparative Sample 11 | 128 | 69 | −59 | 46.1 |
| Comparative Sample 12 | 133 | 87 | −46 | 34.6 |
| Comparative Sample 13 | 132 | 94 | −38 | 28.8 |
| Comparative Sample 14 | 134 | 44 | −90 | 67.2 |
| Comparative Sample 15 | 151 | 70 | −81 | 53.6 |
| Comparative Sample 16 | 162 | 85 | −77 | 47.5 |

From Table 7, it can be seen that the alkali metal-modified acoustic reinforcing material prepared from the alkali metal ion-modified ZSM-5 molecular sieve or ZSM-35 molecular sieve as a raw material shows a significant improvement in $\Delta F_0$ data, as compared with that of Comparative Samples. $\Delta F_0$ data was usually more significantly improved for the molecular sieve with low silica-aluminum ratio.

In addition, from the testing results of $\Delta F_0$ of Samples and Comparative Samples after the VOC treatment shown in Table 7, it can be seen that the alkali metal-modified acoustic reinforcing material prepared from the alkali metal ion-modified ZSM-5 molecular sieve or ZSM-35 molecular sieve as a raw material shows a smaller decrease in acoustic performance $\Delta F_0$ after VOC adsorption. In particular, the improvement of acoustic performance is more significant for the molecular sieve with low silica-alumina ratio. This indicates that the modification with alkali metal results in less adsorption of water and VOC by the sample, which can substantially improve its stability and reliability in terms of acoustic performance, and also improve its basic acoustic performance to some extent.

The above description is only specific examples of the present disclosure and cannot be used to limit the implementable scope of the invention. Therefore, the substitution with equivalent components or equivalent changes and modifications made in accordance with the protection scope of the patent of the present disclosure shall still fall within the scope encompassed by the patent. In addition, arbitrary combinations of technical features and technical features, technical features and technical inventions, and technical inventions and technical inventions of the present disclosure can be used.

The invention claimed is:

1. An alkali metal-modified acoustic reinforcing material, prepared by homogeneously mixing an alkali metal-modified molecular sieve, a binder, a dispersant and an auxiliary agent and then shaping the mixture, wherein the content of the alkali metal-modified molecular sieve is not less than 70%, the dry basis content of the dispersant is not more than 1%, and the dry basis content of the auxiliary agent is not more than 15%, based on 100% of the total weight of the alkali metal-modified acoustic reinforcing material;

wherein the alkali metal-modified molecular sieve is an alkali metal-modified ZSM-5 molecular sieve or an alkali metal-modified ZSM-35 molecular sieve; and wherein the content of the alkali metal is 0.1300-0.4300% or 1.7089%, based on 100% of the total weight of the alkali metal-modified molecular sieve; wherein in the ZSM-35 molecular sieve, the molar ratio of silica to alumina is in the range of 20:1-100:1.

2. The alkali metal-modified acoustic reinforcing material according to claim 1, wherein the alkali metal comprises one or more alkali metals selected from a group consisting of: Li, Na, and K.

3. The alkali metal-modified acoustic reinforcing material according to claim 1, wherein in the ZSM-5 molecular sieve, the molar ratio of silica to alumina is <5000:1, and the grain size is <2 μm.

4. The alkali metal-modified acoustic reinforcing material according to claim 1, wherein-the grain size of the ZSM-35 molecular sieve is <2 μm.

5. The alkali metal-modified acoustic reinforcing material according to claim 1, wherein the alkali metal-modified molecular sieve is prepared by a process comprising:

1) Mixing a molecular sieve with water, warming up the resultant mixture solution to 70-90° C. and mixing the mixture solution homogeneously;

2) adding an alkali metal salt to the mixture solution obtained in step 1) and reacting at a temperature of 70-90° C. for 4-6 h; and 3) upon completion of the reaction, subjecting the solution obtained in step 2) to a solid-liquid separation, continuously washing the separated solid until the conductivity of washing water is <300 μS/cm, drying the resultant solid at a temperature of 100-200° C., and then roasting at a temperature of 350-650° C. for 2-6 h, to obtain the alkali metal-modified molecular sieve.

6. The alkali metal-modified acoustic reinforcing material according to claim 5, wherein the alkali metal salt comprises one or more alkali metal salt selected from a group consisting of: an alkali metal chloride, an alkali metal nitrate, and an alkali metal carbonate, and is used in an amount of 0.05-0.20 by weight of the molecular sieve.

7. The alkali metal-modified acoustic reinforcing material according to claim 1, wherein the content of the binder is 1-15% measured as the content of the solid component in the binder, based on 100% of the total weight of the alkali metal-modified acoustic reinforcing material.

8. The alkali metal-modified acoustic reinforcing material according to claim 7, wherein the binder comprises an inorganic binder and/or an organic binder;

wherein the inorganic binder comprises one or more inorganic binder selected from a group consisting of: silica sol, alumina sol, water glass, and pseudo-boehmite; and the organic binder comprises one or more organic binder selected from a group consisting of: acrylate-based, epoxy-based, and polyurethane-based organic binders.

9. The alkali metal-modified acoustic reinforcing material according to claim 1, wherein the dispersant comprises one or more dispersant selected from a group consisting of: glycerin, HPMA, and liquid paraffin.

10. The alkali metal-modified acoustic reinforcing material according to claim 1, wherein the alkali metal-modified acoustic reinforcing material is in the shape of microspheres having a size of 50-400 μm, blocks or flakes.

11. A speaker comprising one or more acoustic sensors and one or more housings which together form a rear cavity of the speaker, wherein the rear cavity of the speaker is provided with the alkali metal-modified acoustic reinforcing material according to claim 1.

12. An electronic device, provided with the alkali metal-modified acoustic reinforcing material according to claim 1 in a rear cavity of a speaker of the electronic device.

13. The electronic device according to claim 12, wherein the electronic device comprises a smartphone, a TWS earphone, a headset, a smart glass, a smart watch, a VR device, an AR device, a tablet PC or a thin and light laptop.

14. The alkali metal-modified acoustic reinforcing material according to claim 1, wherein the auxiliary agent comprises one or more auxiliary agent selected from a group consisting of: diatomite, silica fume, bentonite, and smectite.

15. A method for producing the alkali metal-modified acoustic reinforcing material according to claim 1, comprising:

homogeneously mixing an alkali metal-modified molecular sieve, a binder, a dispersant, and an auxiliary agent to obtain a suspension, and shaping the suspension to produce the alkali metal-modified acoustic reinforcing material, wherein the content of the alkali metal-modified molecular sieve is not less than 70%, the dry basis content of the dispersant is not more than 1%, and the dry basis content of the auxiliary agent is not more than 15%, based on 100% of the total weight of the alkali metal-modified acoustic reinforcing material.

* * * * *